US009452676B2

(12) United States Patent
Oba

(10) Patent No.: US 9,452,676 B2
(45) Date of Patent: Sep. 27, 2016

(54) ON-BOARD DISPLAY CONTROL DEVICE AND ON-BOARD DISPLAY CONTROL METHOD

(71) Applicant: Alpine Electronics, Inc., Tokyo (JP)

(72) Inventor: Hiroki Oba, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 140 days.

(21) Appl. No.: 14/045,559

(22) Filed: Oct. 3, 2013

(65) Prior Publication Data

US 2014/0118133 A1     May 1, 2014

(30) Foreign Application Priority Data

Oct. 29, 2012   (JP) ................................ 2012-237969

(51) Int. Cl.

| | |
|---|---|
| *B60K 35/00* | (2006.01) |
| *B60Q 1/00* | (2006.01) |
| *B60Q 1/54* | (2006.01) |
| *G01P 1/11* | (2006.01) |
| *G08G 1/123* | (2006.01) |
| *G08G 1/01* | (2006.01) |
| *B60K 37/02* | (2006.01) |

(52) U.S. Cl.
CPC ............... *B60K 35/00* (2013.01); *B60K 37/02* (2013.01); *B60K 2350/1072* (2013.01); *B60K 2350/1096* (2013.01)

(58) Field of Classification Search
CPC .................................................... B60K 35/00
See application file for complete search history.

(56) References Cited

U.S. PATENT DOCUMENTS

| | | | |
|---|---|---|---|
| 7,530,345 B1* | 5/2009 | Plante et al. .................. 123/361 |
| 7,538,795 B2* | 5/2009 | Shibatani ............... H04N 5/232 |
| | | | 348/208.14 |
| 7,835,854 B2 | 11/2010 | Yanamoto et al. | |
| 2006/0271265 A1* | 11/2006 | Kawazoe et al. ............... 701/93 |
| 2007/0150187 A1* | 6/2007 | Kawakami ............. B60K 35/00 |
| | | | 701/431 |
| 2008/0150709 A1* | 6/2008 | Yamamoto et al. .......... 340/441 |
| 2009/0043446 A1* | 2/2009 | Drew et al. ..................... 701/33 |
| 2009/0112389 A1* | 4/2009 | Yamamoto et al. ............ 701/29 |
| 2011/0082620 A1* | 4/2011 | Small et al. .................... 701/29 |
| 2013/0145297 A1* | 6/2013 | Ricci et al. ................... 715/765 |

FOREIGN PATENT DOCUMENTS

| | | |
|---|---|---|
| JP | 2004-237844 | 8/2004 |
| JP | 2005-308477 | 11/2005 |
| JP | 2010-143407 | 7/2010 |

* cited by examiner

*Primary Examiner* — Jennifer Mehmood
*Assistant Examiner* — Pameshanand Mahase
(74) *Attorney, Agent, or Firm* — Brinks Gilson & Lione

(57) ABSTRACT

On-board display control methods and systems are provided. In one implementation for displaying speedometer information and miscellaneous information on an instrument panel display, a nonuse region determination unit of an on-board display control device determines a nonuse speed region in a speedometer in accordance with a traveling status of a vehicle. A display control unit of the on-board display control device then exercises control such that an enlarged view of the miscellaneous information is displayed over the nonuse speed region when the nonuse region determination unit determines that there is the nonuse speech region.

11 Claims, 6 Drawing Sheets

DURING LOW SPEED TRAVEL

DURING HIGH SPEED TRAVEL

ON-BOARD DISPLAY CONTROL DEVICE AND ON-BOARD DISPLAY CONTROL METHOD

RELATED APPLICATIONS

The present application claims priority to Japanese Patent Application Serial Number 2012-237969, filed Oct. 29, 2012, the entirety of which is hereby incorporated by reference.

BACKGROUND OF THE INVENTION

1. Field of the Invention

The present invention relates to an on-board display control device and an on-board display control method, and in particular, relates to a device and a method for controlling display of meter and other information on an on-board display provided in an instrument panel of a vehicle.

2. Description of the Related Art

There have been vehicles that include a liquid crystal display constituting an instrument panel (hereinafter referred to as IP) installed in a dashboard. The on-board display (hereinafter referred to as IP display) provided in the IP displays meter information is used for driving a vehicle, and may provide information such as travel speed, engine rotational speed, and fuel remaining level. In addition, there are vehicles equipped with an IP display configured to display information related to a navigation device and an audio device.

In general, a driver utilizes the meter information, and hence, a relatively large sized view is provided for the driver. In other words, the meter information commonly occupies a large proportion of the IP display. This leaves a small area to display information other than the meter information (hereinafter referred to as "miscellaneous information"). This is problematic in that the visibility of the miscellaneous information may be poor.

A speedometer is designed to indicate the travel speed from a lower limit at 0 km/h to an upper limit at 180 km/h, 260 km/h, or 300 km/h corresponding to the maximum speed of a vehicle. A view of a speedometer designed for an IP display is also displayed in accordance with the form described above. Under general usage, however, vehicles seldom travel at a speed in proximity to the maximum speeds. Hence, an area for high speeds in a speedometer is a dead space that is rarely used.

There are techniques proposed to change a display mode of a speedometer in accordance with a traveling status of a vehicle (refer to, for example, Japanese Patent Application Laid-Open Nos. 2010-143407, 2004-237844, and 2005-308477). Japanese Patent Application Laid-Open No. 2010-143407 describes a technique to change an upper limit value of a speedometer in accordance with a recognition speed, which is a speed that should be recognized by a driver while a vehicle is traveling. Accordingly, a plurality of scales indicating speeds is changed to have different mutual intervals (refer to FIGS. 7 and 8).

Japanese Patent Application Laid-Open No. 2004-237844 describes a technique, for a speedometer that allows a partially enlarged view, to change a speed range for the enlarged view in accordance with the classification of a road (a road with a low speed limit or a freeway) being traveled on (refer to FIG. 3). Japanese Patent Application Laid-Open No. 2005-308477 describes a technique to change a lower limit value and an upper limit value of a speedometer of a vehicle for display in accordance with a travel speed of the vehicle (refer to FIGS. 1 and 2).

SUMMARY OF THE INVENTION

According to the techniques described above in Japanese Patent Application Laid-Open Nos. 2010-143407, 2004-237844, and 2005-308477, the visibility of a speedometer can be improved in accordance with the traveling status of a vehicle. These techniques, however, are unable to improve the visibility of the miscellaneous information.

The present invention has been achieved to solve such a problem, and it is an object of the present invention to be able to improve the visibility of the miscellaneous information without impairment of the visibility of the speedometer.

To address the problem described above, implementations of the present invention determine a nonuse speed region in a speedometer on the basis of a traveling status of a vehicle, so that the miscellaneous information, which is not the speedometer information to be displayed in an IP display, is displayed in an enlarged view over the determined nonuse speed region described above.

In implementations of the present invention configured as described above, when it can be determined that there is an unused speed region (for example, a high speed region or a low speed region) in part of a speedometer in accordance with a traveling status of a vehicle, an enlarged view of the miscellaneous information is displayed over the nonuse speed region. In this way, while a speed region in use in the speedometer information is displayed in an easily recognizable manner, an enlarged and easily recognizable view of the miscellaneous information can be provided. This can improve the visibility of the miscellaneous information in accordance with the traveling status of the vehicle without impairment of the visibility of the speedometer.

DETAILED DESCRIPTION OF THE DRAWINGS

Figure 1:
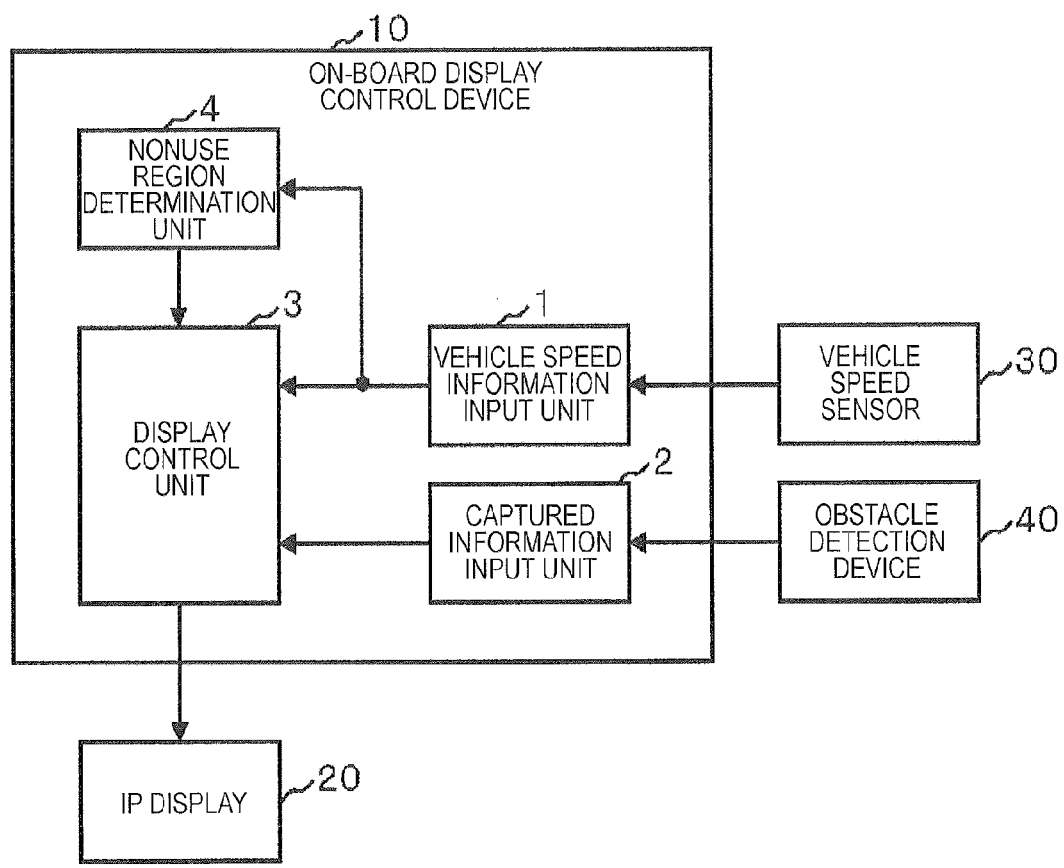
FIG. 1 is a block diagram of one implementation of an exemplary functional configuration of an on-board display control device.

Some embodiments of the present invention will be described with reference to the drawings. FIG. 1 is a block diagram of one implementation of an exemplary functional configuration of an on-board display control device 10. As illustrated in FIG. 1, the on-board display control device 10 may include, in a functional configuration thereof, a vehicle speed information input unit 1, a captured information input unit 2, a display control unit 3, and a nonuse region determination unit 4. In addition, the on-board display control device 10 is connected to an IP display 20, a vehicle speed sensor 30, and an obstacle detection device 40.

Here, each functional block of the vehicle speed information input unit 1, the captured information input unit 2, the display control unit 3, and the nonuse region determination unit 4 can be achieved using any of a hardware configuration, a DSP, and software. In the case of using software, each functional block 1 to 4 is configured with a computer CPU, an MPU, a RAM, or a ROM, etc., and can be achieved by an operation of a program stored in a storage medium, such as a RAM, a ROM, and a hard disk.

The vehicle speed information input unit 1 receives an input of vehicle speed information from the vehicle speed sensor 30 and supplies the information to the display control unit 3 and the nonuse region determination unit 4. The captured information input unit 2 receives an input of a captured image of the surroundings of a vehicle from the obstacle detection device 40 and supplies the image to the display control unit 3.

The display control unit 3 generates speedometer information on the basis of the vehicle speed information received from the vehicle speed information input unit 1 to display the generated information on the IP display 20. The speedometer information refers to image information schematically representing a physical speedometer. In some implementations, an image of the speedometer is generated by positioning a plurality of numeric characters and scales indicating speeds along a circumference of a circular speedometer and by drawing an indicator at a position in accordance with the vehicle speed information received from the vehicle speed information input unit 1. The image of the speedometer is displayed as the speedometer information on the IP display 20.

In addition, the display control unit 3 allows the IP display 20 to display the captured image of the surroundings of the vehicle, which has been received from the obstacle detection device 40, as miscellaneous information, which is not the speedometer information. In this case, the miscellaneous information is, for example, another vehicle, which is captured in an image by a camera, not shown, in the surroundings of the vehicle and which is marked in a conspicuous manner as an obstacle in the image.

The captured image of the surroundings of the vehicle is intended for purposes of illustration only to describe the miscellaneous information, which may include other information. For example, the miscellaneous information may be navigation information for navigating and guiding a vehicle to a destination, and entertainment information relating to an on-board entertainment device, such as radio station frequencies, selected music recorded in a DVD or a hard disk, and a volume level.

The nonuse region determination unit 4 determines a nonuse speed region in the speedometer on the basis of a traveling status of the vehicle. In some implementations, the nonuse region determination unit 4 determines, on the basis of the vehicle speed information input from the vehicle speed information input unit 1, whether or not a travel speed of the vehicle satisfies a traveling status that the travel speed is equal to or lower than a first predetermined speed V1 (for example, 60 km/h) for a predetermined time period. If it is determined that this traveling status is satisfied, the nonuse region determination unit 4 determines that a region extending from a second predetermined speed V2 (for example, 100 km/h, where V1≤V2) toward a higher speed in the speedometer is the nonuse speed region.

In other words, the travel speed of the vehicle being equal to or less than 60 km/h for the predetermined time period indicates that the vehicle is traveling on a road with a low speed limit, and not on a freeway. Accordingly, the nonuse region determination unit 4 determines that the region extending from 100 km/h toward the higher speed in the speedometer is the nonuse speed region on the assumption that the vehicle speed will not exceed 100 km/h.

If the nonuse region determination unit 4 determines that there is the nonuse speed region, the display control unit 3 then displays an enlarged view of the miscellaneous information over the nonuse speed region. In this case, the display control unit 3 exercises control such that the speedometer information in the nonuse speed region is not displayed but a use speed region, which is outside the nonuse speed region, is displayed without a change to a prearranged state and a display mode.

Figure 2A:
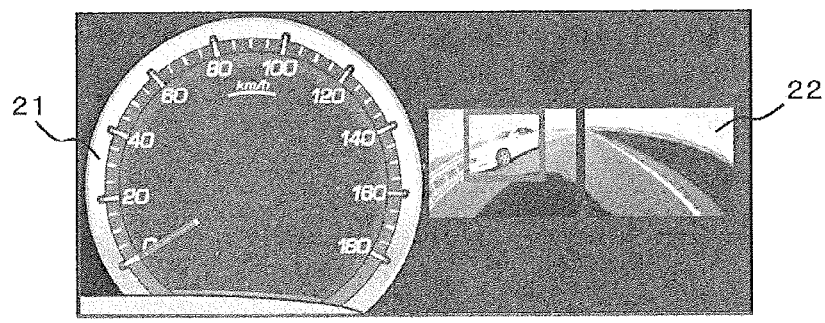
FIG. 2A is a diagram of an exemplary view of an IP display.
Figure 2A:
Figure 2B:
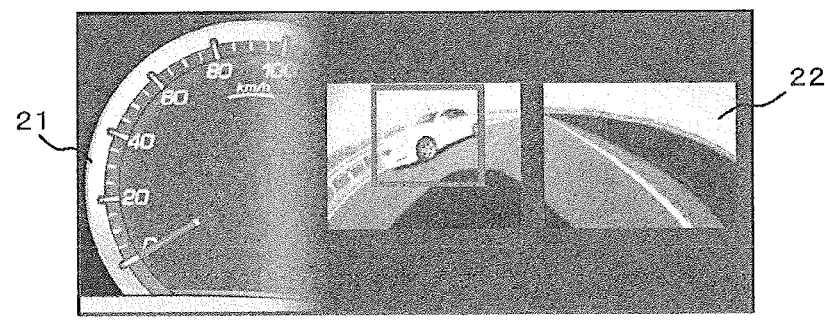
FIG. 2B is a diagram of an exemplary view of the IP display.

FIGS. 2A and 2B are diagrams of exemplary views of the IP display 20 under the control of the display control unit 3. FIG. 2A is a diagram of an exemplary view in a prearranged state in the case where the nonuse region determination unit 4 determines that the travel speed of the vehicle is not equal to or lower than 60 km/h for the predetermined time period, and thus, that there is no nonuse speed region in the speedometer (in other words, a high speed region and a low speed region are both likely to be used). In this case, the display control unit 3 enables speedometer information 21, which is most important for a driver, to be displayed in a prearranged manner and miscellaneous information 22 to be also displayed in a prearranged size.

FIG. 2B is a diagram of an exemplary view in the case where the nonuse region determination unit 4 determines that the travel speed of the vehicle is equal to or lower than 60 km/h for the predetermined time period, and thus, that there is the nonuse speed region in the speedometer (in other words, the high speed region is highly unlikely to be used). In this case, the display control unit 3 enables an enlarged view of the miscellaneous information 22 to be displayed over the nonuse speed region (the high speed region extending from 100 km/h toward the higher speed) in the speedometer. A part of the speedometer information 21, resided in the nonuse speed region, is excluded from the view. Another part of the speedometer information 21, resided in the use speed region (a mid-to-low speed region extending from 100 km/h toward a lower speed), which is outside the nonuse speed region, is displayed without a change to the prearranged display mode illustrated in FIG. 2A.

Figure 3:
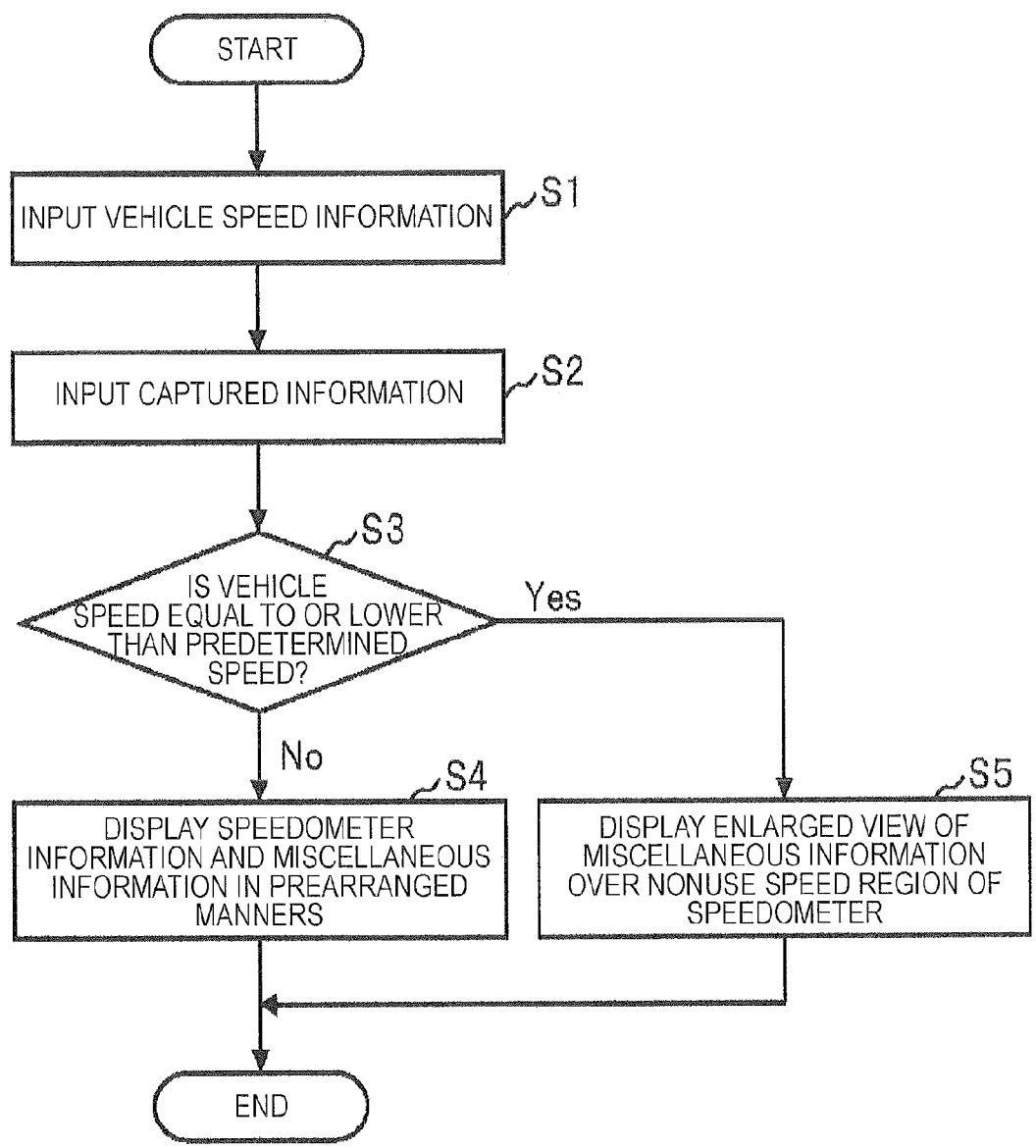
FIG. 3 is a flowchart of an exemplary operation of an on-board display control device.

FIG. 3 is a flowchart of an exemplary operation of the on-board display control device 10 configured as described above. Note that the flowchart illustrated in FIG. 3 is started when an accessory power supply (ACC) of the vehicle is turned on.

The vehicle speed information input unit 1 receives an input of the vehicle speed information from the vehicle speed sensor 30 and supplies the information to the display control unit 3 and the nonuse region determination unit 4 (step S1). The captured information input unit 2 receives an input of the captured image of the surroundings of the vehicle from the obstacle detection device 40 and supplies the image to the display control unit 3 (step S2).

In some implementations, the nonuse region determination unit 4 determines, on the basis of the vehicle speed information input from the vehicle speed information input unit 1, whether or not the travel speed of the vehicle is equal to or lower than the first predetermined speed V1 (for example, 60 km/h) for the predetermined time period (step S3). If it is determined that the travel speed of the vehicle is not equal to or lower than the first predetermined speed V1 for the predetermined time period, the display control unit 3 enables the IP display 20 to display both the speedometer information and the miscellaneous information in the pre-arranged manners (step S4).

If it is determined by the nonuse region determination unit 4 that the travel speed of the vehicle is equal to or lower than the first predetermined speed V1 for the predetermined time period, and thus there is the nonuse speed region in the speedometer in a region extending from the second predetermined speed V2 (for example, 100 km/h) toward the higher speed, the display control unit 3 allows an enlarged view of the miscellaneous information, which is not the speedometer information, to be displayed over the nonuse speed region (step S5). When processing of step S4 or step S5 has been performed, processing of the flowchart illustrated in FIG. 3 is finished. The processing of this flowchart is performed in a repetitive manner.

As described above in detail, in some implementations, the presence of the nonuse speed region in the speedometer is determined on the basis of the travel speed of the vehicle. If it is determined that there is the nonuse speed region, an enlarged view of the miscellaneous information, which is not the speedometer information to be displayed on the IP display 20, is displayed over the determined nonuse speed region described above.

According to implementations configured as described above, when the travel speed of the vehicle is low, an enlarged and easily recognizable view of the miscellaneous information can be provided, while a speed region in use in the speedometer information is displayed in an easily recognizable manner. This can improve the visibility of the miscellaneous information in accordance with the travel speed of the vehicle without impairment of the visibility of the speedometer.

Note that in the implementations described above, the first predetermined speed V1 and the second predetermined speed V2 are different values, but an identical value may be used. For example, if the travel speed of the vehicle is equal to or lower than a first predetermined speed V1 (for example, 60 km/h) for a predetermined time period, it may be determined that a region extending from a second predetermined speed V2 (60 km/h) toward a higher speed in a speedometer is the nonuse speed region, so that an enlarged view of the miscellaneous information may be displayed over the nonuse speed region.

Note, however, that even if it can be determined that the travel speed of the vehicle is equal to or lower than 60 km/h for the predetermined time period, and hence the vehicle is traveling on a road with a low speed limit, a view of the speedometer information merely up to 60 km/h may result in poor visibility of an indicator of the speedometer during the travel at around 60 km/h. In addition, there is no assurance that the travel speed will never exceed 60 km/h. Hence, the first predetermined speed V1 and the second predetermined speed V2 are preferably different from each other to provide a certain margin.

In addition, in the implementations described above, the example has been described, in which it is determined that the high speed region in the speedometer is the nonuse speed region, but the present invention is not limited by this example. For example, under a traveling status that the travel speed of a vehicle is equal to or higher than a first predetermined speed V1 (for example, 80 km/h) for a predetermined time period, a nonuse region determination unit 4 may determine that a region extending from a second predetermined speed V2 (for example, 60 km/h, where V1≥V2) toward a lower speed in the speedometer is the nonuse speed region.

In other words, the travel speed of the vehicle equal to or higher than 80 km/h for the predetermined time period indicates that the vehicle is traveling on a freeway, not on a road with a lower speed limit. Accordingly, the nonuse region determination unit 4 determines that the region extending from 60 km/h toward the lower speed in the speedometer is the nonuse speed region on the assumption that the vehicle speed will not be reduced below 60 km/h. In this case, the display control unit 3 places a view of the miscellaneous information at the left side of the speedometer information. The display control unit 3 allows an enlarged view of the miscellaneous information displayed over the nonuse speed region, which extends from 60 km/h toward the lower speed in the speedometer information.

In addition, in the implementations described above, the example has been described, in which the nonuse region determination unit 4 determines the nonuse speed region on the basis of the vehicle travel speed, but the present invention is not limited by this example. For example, under a traveling status that a vehicle is traveling on a road with a speed limit equal to or lower than a predetermined speed V1 (for example, 60 km/h), a nonuse region determination unit 4 may determine that a region extending from a second predetermined speed V2 (for example, 100 km/h, where V1≤V2) toward a higher speed in the speedometer is the nonuse speed region. This is because the vehicle being traveling on the road with a speed limit equal to or lower than 60 km/h allows the determination that the vehicle is traveling on a road with a low speed limit.

Meanwhile, under a traveling status that a vehicle is traveling on a road with a speed limit equal to or higher than a predetermined speed V1 (for example, 80 km/h), a nonuse region determination unit 4 may determine that a region extending from a second predetermined speed V2 (for example, 60 km/h, where V1≥V2) toward a lower speed in the speedometer is the nonuse speed region. This is because the vehicle traveling on the road with a speed limit equal to or higher than 80 km/h allows the determination that the vehicle is traveling on a freeway.

Figure 4:
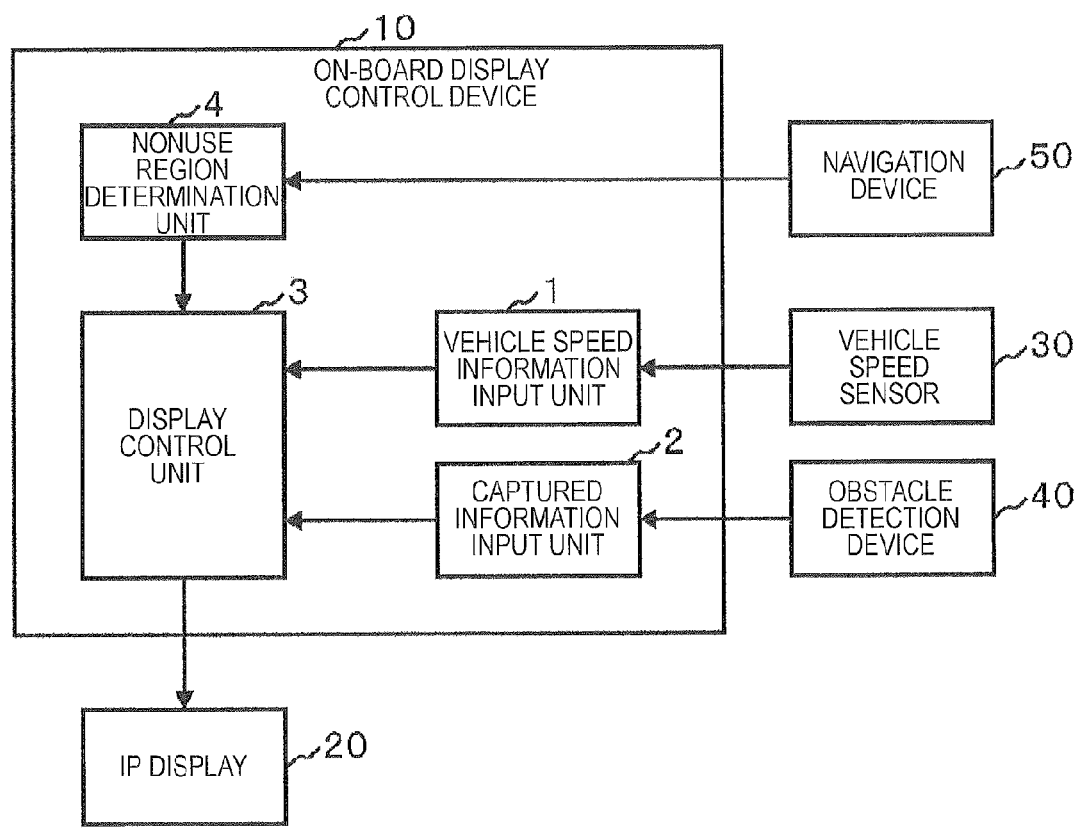
FIG. 4 is a block diagram of another exemplary functional configuration of an on-board display control device.

FIG. 4 is a diagram of an exemplary configuration, in which a nonuse region determination unit 4 determines the nonuse speed region on the basis of a speed limit. In an example illustrated in FIG. 4, an on-board display control device 10 is connected to a navigation device 50. The navigation device 50 includes map data stored therein. Road link information included in the map data includes road speed limit information. The nonuse region determination unit 4 receives an input of the speed limit information from the navigation device 50 to determine the nonuse speed region.

Note that the input of the speed limit information is not limited by the example in which the input is received from the navigation device 50. For example, a speed limit for a road being traveled on may be detected by recognizing a traffic sign or a road marking in an image of the surroundings of a vehicle captured by a camera not shown.

In addition, in the exemplary configuration illustrated in FIG. 4, the nonuse region determination unit 4 may receive road classification information included in the map data stored in the navigation device 50. If it is determined that the vehicle is traveling on a road with a low speed limit on the basis of the road classification information, it may be determined that a region extending from a predetermined speed (for example, 100 km/h) toward a higher speed in the speedometer is the nonuse speed region. Meanwhile, if a nonuse region determination unit 4 determines that a vehicle is traveling on a freeway, the nonuse region determination unit 4 may determine that a region extending from a predetermined speed (for example, 60 km/h) toward a lower speed in the speedometer is the nonuse speed region on the basis of the road classification information received from the navigation device 50.

Furthermore, in the exemplary configuration illustrated in FIG. 4, a nonuse region determination unit 4 may receive traffic congestion information from a navigation device 50 and, under a traveling status that a vehicle is traveling through traffic congestion, determine that a region extending from a predetermined speed (for example, 100 km/h) toward a higher speed in the speedometer is the nonuse speed region.

Figure 5:
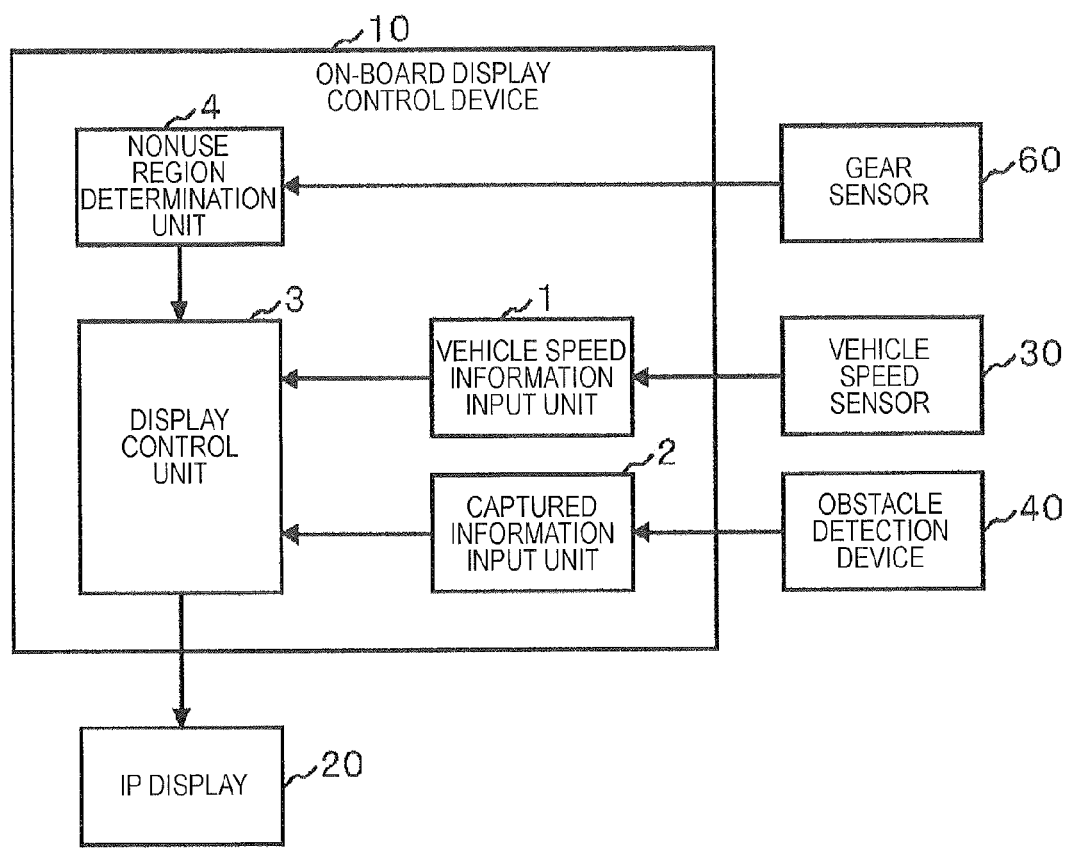
FIG. 5 is a block diagram of another exemplary functional configuration of an on-board display control device.

Alternatively, as illustrated in FIG. 5, a nonuse region determination unit 4 may determine, under a traveling status that a vehicle is traveling backward, that a region extending from a predetermined speed (for example, 100 km/h) toward a higher speed in a speedometer is the nonuse speed region on the basis of gear information received from a gear sensor 60.

In the implementations described above, the examples have been described, in which, when an enlarged view of the miscellaneous information is to be displayed over the nonuse speed region, the display control unit 3 excludes a part of the view of the speedometer information, resided in the nonuse speed region, and allows another part of the view of the speedometer information, resided in the use speed region which is outside the nonuse speed region, to be displayed without a change to the prearranged state and the display mode, but the present invention is not limited by these examples.

For example, when an enlarged view of the miscellaneous information is displayed over the nonuse speed region, the speedometer information may be displayed with changes to an upper limit value (in the case where the nonuse speed region is in a high speed region) or a lower limit value (in the case where the nonuse speed region is in a low speed region), and mutual intervals of a plurality of scales indicating speeds of the speedometer from the prearranged states.

More specifically, in the case where a high speed region extending from 100 km/h toward the higher speed is the nonuse speed region, an entire view of the speedometer information in a circular shape may be displayed in a region not covered by the enlarged view of the miscellaneous information. In this case, the upper limit value of the speed is changed to 100 km/h with the lower limit value at 0 km/h, and the intervals of the scales from 0 to 100 km/h are changed from the prearranged state. In this manner, the visibility of the speedometer information with the nonuse speed region excluded can be improved.

Figure 6:
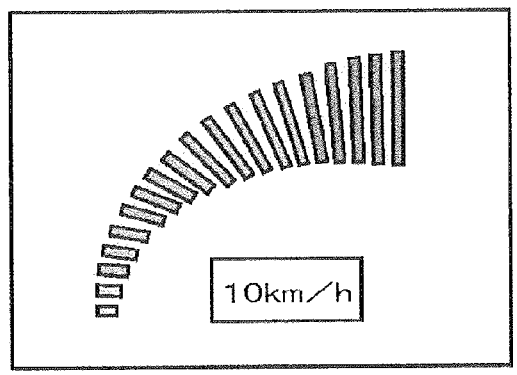
FIG. 6 is a diagram of exemplary speedometer information displayed in an IP display.

The form of the speedometer information illustrated in the implementations described above is intended for purposes of illustration only and the present invention is not limited by this example. For example, as illustrated in FIG. 6, the speedometer information may be of a digital indicator type, in which a segment flashes in accordance with a travel speed.

The implementations described above present specific examples to implement the present invention and should in no way be construed, however, as limiting the scope of the present invention. In other words, the present invention can be implemented in various forms without departing from the spirit or major characteristics of the present invention.

It is intended that the foregoing detailed description be regarded as illustrative rather than limiting, and that it be understood that it is the following claims, including all equivalents, that are intended to define the spirit and scope of this invention.

What is claimed is:

1. An on-board display control device configured to display speedometer information and miscellaneous information on an instrument panel display ("IP display") of a vehicle, the control device comprising:
  a nonuse region determination unit configured to determine a nonuse speed region in a speedometer based on a speed of a vehicle; and
  a display control unit configured to exercise control such that an enlarged view of the miscellaneous information is displayed over the nonuse speed region when the nonuse region determination unit determines that there is the nonuse speed region in the speedometer;
  wherein the nonuse region determination unit is configured to determine when the speed of the vehicle is equal to or less than a first predetermined speed V1 for a predetermined time period, that a region extending from a second predetermined speed V2 toward a higher speed in the speedometer is the nonuse speed region, where the first predetermined speed V1 is less than the second predetermined speed V2.

2. The on-board display control device according to claim 1, wherein the nonuse region determination unit is further configured to determine when the speed of the vehicle is equal to or greater than a third predetermined speed V3 for a predetermined time period, that a region extending from a fourth predetermined speed V4 toward a lower speed in the speedometer is the nonuse speed region, where the third predetermined speed V3 is greater than or equal to the fourth predetermined speed V4.

3. The on-board display control device according to claim 1, wherein the nonuse region determination unit is further configured to determine when the vehicle is traveling on a road with a speed limit equal to or lower than a third predetermined speed V3, that a region extending from a fourth predetermined speed V4 toward a higher speed in the speedometer is the nonuse speed region, where the third predetermined speed V3 is less than or equal to the fourth predetermined speed V4.

4. The on-board display control device according to claim 1, wherein the nonuse region determination unit is further configured to determine when the vehicle is traveling on a road with a speed limit equal to or higher than a third predetermined speed V3, that a region extending from a fourth predetermined speed V4 toward a lower speed in the speedometer is the nonuse speed region, where the third predetermined speed V3 is greater than or equal to the fourth predetermined speed V4.

5. The on-board display control device according to claim 1, wherein the nonuse region determination unit is further configured to determine when the vehicle is traveling on a road with a low speed limit, that a region extending from a third predetermined speed toward a higher speed in the speedometer is the nonuse speed region.

6. The on-board display control device according to claim 1, wherein the nonuse region determination unit is further configured to determine when the vehicle is traveling on a freeway, that a region extending from a third predetermined speed toward a lower speed in the speedometer is the nonuse speed region.

7. The on-board display control device according to claim 1, wherein the nonuse region determination unit is further configured to determine when the vehicle is traveling through traffic congestion, that a region extending from third a predetermined speed toward a higher speed in the speedometer is the nonuse speed region.

8. The on-board display control device according to claim 1, wherein the nonuse region determination unit is further configured to determine when the vehicle is traveling backward, that a region extending from a third predetermined speed toward a higher speed in the speedometer is the nonuse speed region.

9. The on-board display control device according to claim 1, wherein the display control unit is configured to exercise control such that, when the enlarged view of the miscellaneous information is displayed over the nonuse speed region, the speedometer information in the nonuse speed region is not displayed, and the speedometer information in a use speed region, which is outside the nonuse speed region, is displayed without a change to a prearranged state and a display mode.

10. The on-board display control device according to claim 1, wherein the display control unit is configured to exercise control such that, when the enlarged view of the miscellaneous information is displayed over the nonuse speed region, the speedometer information is displayed with changes to an upper limit value or a lower limit value, and is displayed with mutual intervals of a plurality of scales indicating speeds of the speedometer from prearranged states.

11. An on-board display control method for displaying speedometer information and miscellaneous information on an instrument panel display ("IP display") of a vehicle, the method comprising, in sequence:

determining, by a nonuse region determination unit of an on-board display control device, a nonuse speed region in a speedometer based on a speed of a vehicle, wherein when the speed of the vehicle is equal to or less than a first predetermined speed V1 for a predetermined time period, the nonuse region determination unit determines that a region extending from a second predetermined speed V2 toward a higher speed in the speedometer is the nonuse speed region, where the first predetermined speed V1 is less than the second predetermined speed V2; and exercising control, by a display control unit of the on-board display control device, such that an enlarged view of the miscellaneous information is displayed over the nonuse speed region when the nonuse region determination unit determines that there is the nonuse speed region in the speedometer.

* * * * *